(12) United States Patent
Buchholz

(10) Patent No.: US 6,544,114 B2
(45) Date of Patent: Apr. 8, 2003

(54) METHOD AND SYSTEM FOR CONTROLLING AN AIR MASS FLOW IN AN AIRCRAFT

(75) Inventor: Uwe Albert Buchholz, Bliedersdorf (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/760,159

(22) Filed: Jan. 11, 2001

(65) Prior Publication Data

US 2001/0007337 A1 Jul. 12, 2001

(30) Foreign Application Priority Data

Jan. 11, 2000 (DE) .......................... 100 00 669

(51) Int. Cl.⁷ .............................................. B64D 13/02
(52) U.S. Cl. ...................................... 454/74; 244/118.5
(58) Field of Search .................... 244/118.5; 454/71, 454/70, 75

(56) References Cited

U.S. PATENT DOCUMENTS 3,825,212 A * 7/1974 Darges et al. ................. 236/13

5,273,486 A   12/1993 Emmons et al.
6,283,410 B1 * 9/2001 Thompson .................... 244/59

FOREIGN PATENT DOCUMENTS

DE    4316886    11/1994
EP    0926579    6/1999

* cited by examiner

Primary Examiner—Derek S. Boles
(74) Attorney, Agent, or Firm—W. F. Fasse; W. G. Fasse

(57) ABSTRACT

An air mass or volume flow in an aircraft is controlled in a closed loop control system. A controllable air distribution network is formed by pipes, ducts, valves, fans, a fresh air supply and climate packs. The generation of a closed loop control signal is based on a continuous recalculation or updating of rated performance characteristic data with regard to current pressure, temperature and altitude data. The updated data are compared with actually measured current data to produce the control signal. The rated performance characteristic data are stored in a memory connected to a corrected (32) which also receives the current data. The sensing ascertains one or more temperature, pressure, altitude and flow volume data to Provide current actually measured data which are then compared with the updated data for generating the closed loop control signal for at least certain of the valves, fans, and fresh air supply.

18 Claims, 2 Drawing Sheets

METHOD AND SYSTEM FOR CONTROLLING AN AIR MASS FLOW IN AN AIRCRAFT

PRIORITY CLAIM

This application is based on and claims the priority under 35 U.S.C. §119 of German Patent Application 100 00 669.8, filed on Jan. 11, 2000, the entire disclosure of which is incorporated herein by reference.

FIELD OF THE INVENTION

An air mass or air volume flow, particularly in a distribution network in a passenger aircraft cabin is controlled by control ling the flow through the distribution network in response to a plurality of parameters such as the flight altitude, which parameters have an influence on the flow volume.

BACKGROUND INFORMATION

In aircraft and particularly in passenger aircraft it is important for the passengers' comfort that an air mass flow through the cabin is balanced. This means that the air volume supplied into the cabin must be balanced relative to the air volume taken out of the cabin at any altitude, at any temperature and at any cabin pressure. Pressures and temperatures inside and outside of the aircraft are parameters that have an influence on the air mass flow balance through the air flow distribution network comprising pipes, ducts, valves, flaps, fans, blowers, at least one fresh air turbo-engine and one or more climate packs in the aircraft fuselage.

The air mass flow in an aircraft frequently must be distributed to outlets or other air users in a variable manner. For controlling this variable distribution of the air volume, pressure loss characteristics of the flow control elements are used as control values for adjusting the flow control elements such as valves or other flow cross-section varying devices in such a manner that the air distribution follows closed loop control algorithms. These algorithms operate on the basis of known, determined, rated values for example of the pressure or temperature of the air mass flow or air volume flow through the air distribution network. The closed loop control rules for the variable air distribution are determined as variable control values or in accordance with the so-called two-point closed loop air control. Reference is made in this connection to air flow control systems in several Airbus Models such as A300, A310, A319, A320, A321, A330, A340 and A300Fr-600R. These known airflow control systems are referred to as closed loop trim air pressure control in trim air common air supply pipe.

More complex problems must be solved where it becomes necessary to control an air mass or volume flow inside an involved air mass flow distribution network simply referred to herein as network or distribution network. Such networks include a plurality of pipes and ducts connected to many air consumers and outlets that may require different air volumes to be controlled by different air distribution rules. Similar considerations apply where the entire air input volume into such an air distribution network is to be uniformly increased or diminished. Efforts have been made in this connection to individually control the air mass or air volume in each individual pipe or duct of the network. The entire air volume supply has also been controlled by varying the total air supply through variably controlling air supply units such as turbo-engines which supply fresh air into the distribution network.

Conventional air flow or volume controls make use of flow data of a common supply line of the network to provide control signals for controlling the air flow and supply. However, these conventional controls are subject to air mass flow deviations that conventionally have not been corrected. Such deviations depend for example on the variable flight altitude during ascent and descent flight and on the constant flight altitude during cruising flight. The invention aims at providing such an altitude correction of the air mass flow in the air distribution network.

A so-called G +T fan control of turbo-engines that is responsive to pressure, is known for maintaining a constant air volume supply is used in the Airbus Model A310. It is further known from European Patent Publication EP 0,926, 579 A1 to control in closed loop fashion flow adjustment devices in response to the static pressure in the main air supply line or duct to provide a variable air volume supply. However, such a control does not take into account that in an aircraft the overall cabin pressure is variable. This variable overall pressure substantially influences the pressure loss characteristic of air distribution network components or elements such as valves, pipes, ducts, turbo-engines, air conditioners, fans or blowers, etc.

German Patent Publication DE 43 16 886 A1 (Bloch et al.) describes an aircraft cabin pressure closed loop control device for an aircraft wherein a closed loop controller (3, 7) compares an actual value with a rated value of the cabin pressure. The resulting signal is used to control an air outlet valve (11). The air outlet valve (11) is driven by a drive (10), the drive speed of which is controlled in closed loop fashion. The ad justed valve position itself is not sensed, merely the cabin pressure is sensed. The actual cabin pressure depends on the air supply through the valve (11) and on the fresh air supply (13) into the cabin. Thus, the valve adjustment speed is controlled exclusively in response to the difference between the rated cabin pressure value and the actual pressure value without regard to the variable performance characteristic of the valve itself.

U.S. Pat. No. 5,273,486 (Emmons et al.) describes an aircraft cabin pressure control system which is adaptable to the requirements of ascent and decent flight with the help of ascent and descent schedules which accommodate variable requirements of specific airlines, the airlines' route structures, and regional air traffic control standards. The Emmons system includes an adaptive control logic that identifies a plurality of points generated by the schedules that define ascent and descent curves corresponding to anticipated cabin pressure change rates during ascent and descent. During aircraft flight, the logic samples and stores actual cabin pressure change rates at each of the plurality of points. After the flight, the actual cabin pressure change rates are averaged and the average rate is compared to the anticipated cabin pressure change rate at each point. An offset is then calculated representing the difference between the average actual rate and an anticipated rate, and the ascent and/or descent schedules are adapted by the offset to bring the anticipated cabin pressure change rates closer to the average actual rate. After several flights, the ascent and descent schedules are customized by the adaptive control logic to a particular airline's requirements. Emmons et al., by expressly storing pressure change rates as a function of ascent and descent flight altitudes for use in the cabin pressure control have not recognized the need for considering other parameters for the control of air flow volumes in an aircraft.

OBJECTS OF THE INVENTION

In view of the foregoing it is the aim of the invention to achieve the following objects singly or in combination:

to correct the air mass or volume flow into and out of an aircraft cabin by making corrections with regard to the instantaneous altitude at which the aircraft is flying;

to control, in closed loop fashion, the air flow controlling elements in an air flow distribution network, such as valves, turbo-engines, fans or blowers in response to a function that takes into account changes in the performance characteristics of these air flow controlling elements, whereby these performance changes depend on pressure, temperature and altitude changes during flight;

to further take into account in the generation of the closed feedback control signal, any measuring errors, any pressure loss characteristics of the air flow controlling elements and the pressure, temperature and air flow volume inside the air flow distribution conduits such as pipes and/or ducts of the network; and to correct or update standardized or rated performance characteristics of the air flow controlling elements with reference to current pressure, temperature and altitude data to provide updated performance characteristics for comparing with actual performance characteristics to thereby generate a control signal for controlling the air flow volume under current operating conditions.

SUMMARY OF THE INVENTION

According to the invention the above objects have been achieved by a system for controlling an air mass flow inside an aircraft fuselage in response to a current flight altitude, said system comprising a controllable air mass flow distribution network including air flow conduits (7, 7', 9, 71, 71'), at least one air outlet (9') connected to one of said air flow conduits, at least one controllable air flow control element (8, 51, 52, 53) connected to said air flow conduits for moving air through said air mass flow distribution network to said at least one air outlet (9'), a closed loop control unit (1) including a memory (2) for storing rated, first data representing at least one rated performance characteristic of said at least one controllable air flow control element in said air mass flow distribution network, a first group of network related sensors (5, 9", 51', 52', 53', 71'), a second group of aircraft related sensors (11, 12), said first and second group of sensors including pressure sensors, temperature sensors, performance sensors including air flow volume sensors, and at least one altitude sensor, said first group of sensors being positioned for sensing actual second data representing any one of actual performance characteristics, actual pressure, and actual temperature of said air mass flow distribution network, said second group of sensors being positioned for sensing actual third data representing any one of actual altitude, temperature and pressure data of said aircraft fuselage, said closed loop control unit (1) further comprising a corrector (32) having a first input connected to said memory (2) for receiving said rated first data and a second input connected to said second group of sensors (11, 12) to receive said actual third data for calculating parameter corrected data, said closed loop control unit (1) further including a comparator (31) having a first input connected to an output of said corrector (32) for receiving said parameter corrected data from said corrector (32), said comparator (31) having a second input connected to said first group of sensors for receiving said actual second data, said comparator (31) comprising an output (3) connected to said at least one controllable air flow control element of said air mass flow distribution network for controlling said air mass flow through said at least one controllable air flow control element.

According to the invention the following data are acquired singly or in combination through respective sensors for processing in a data acquisition section of the closed loop control unit:

(1) air pressure inside any of the pipes and ducts of the air flow distribution network, (2) air pressure outside of the network including cabin pressure and atmospheric pressure outside the aircraft, (3) the air temperature inside the network, (4) the air temperature outside the network including the cabin temperature and the temperature outside of the aircraft body, (5) the air volume or mass flowing through the network, and (6) the flight altitude.

Thus, various types of sensors and/or measuring devices are used in combination according to the invention such as temperature sensors, pressure sensors, air volume flow sensors and altitude sensors. These sensors are connected with their outputs to the data acquisition and conversion circuit of the closed loop control unit or to a performance characteristics correcting circuit. The data acquisition circuit processes the respective sensor information or data to provide respective actual flow volume signals to one input of the comparator. These flow volume signals represent actual performance characteristics of the above mentioned network elements under the actual current pressure, temperature and altitude conditions. The computer section for correcting rated performance characteristics stored in the memory provides updated performance characteristic values or data for comparing with the actual performance characteristic values or data to produce closed loop control signals that will correct the operation of the controllable air flow control elements, such as valves, fans and a fresh air supply, for example provided by a turbo-engine, which will be controlled with due regard to any pressure lose in these air mass flow distribution network elements. The rated performance characteristics are established under standard operating conditions on the ground and stored in the memory such as a ROM. The invention has recognized that the rated operating conditions must be corrected with reference to current flight data operating conditions such as altitude when the standardized operating conditions such as ground level and room temperature are no longer present.

BRIEF DESCRIPTION OF THE DRAWINGS

In order that the invention may be clearly understood, it will now be described in connection with two example embodiments, with reference to the accompanying drawings, wherein the block diagrams of FIGS. 1 and 2 show the air mass flow closed loop control system according to the invention whereby the air distribution conduit network is drawn in full lines and electrical conductor or data bus connections including a closed loop control are shown by dashed lines.

DETAILED DESCRIPTION OF PREFERRED EXAMPLE EMBODIMENTS AND OF THE BEST MODE OF THE INVENTION

Figure 1:
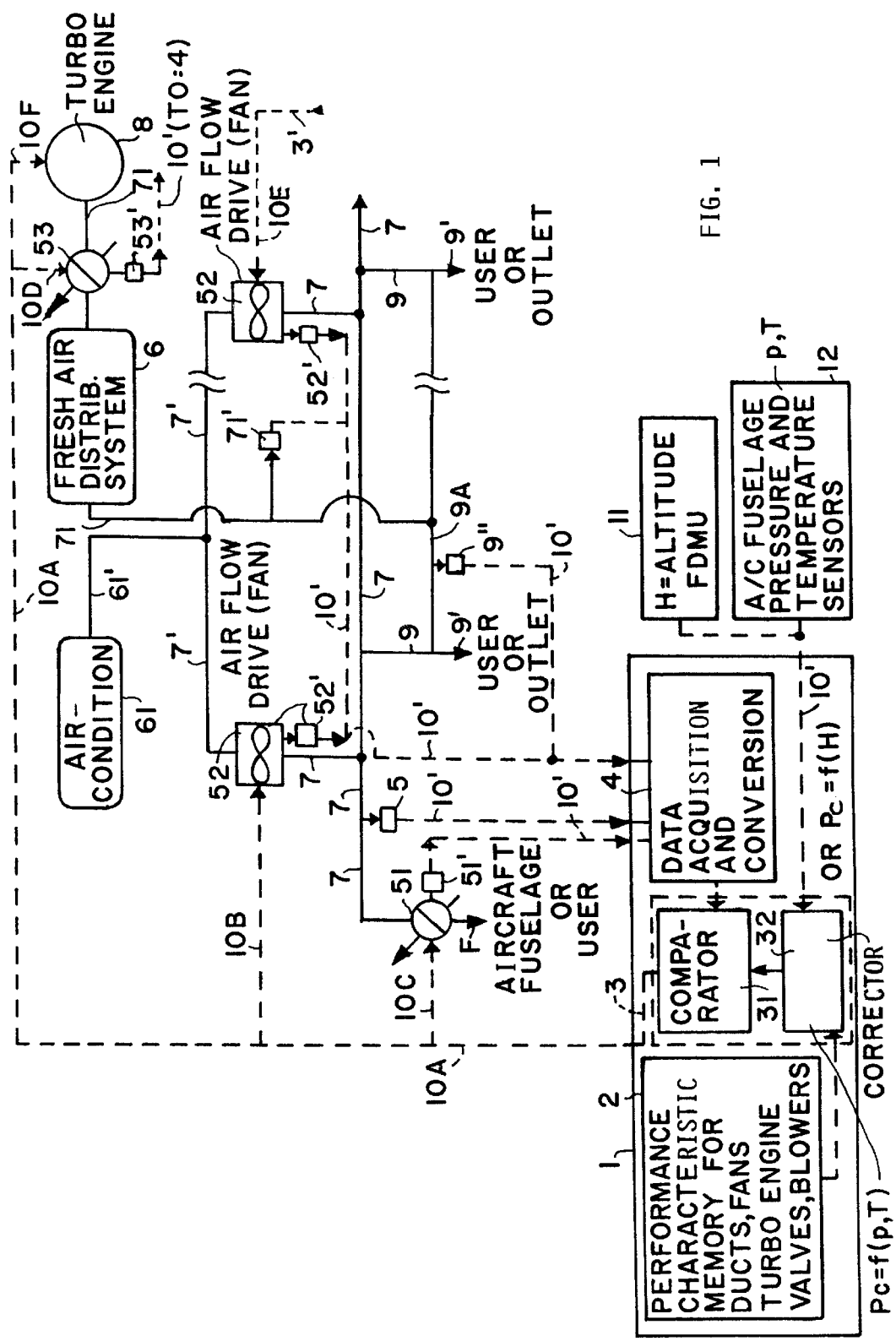
FIG. 1 shows a closed loop control unit 1 which is preferably part of a central processing unit (CPU). The control unit 1 includes a memory 2 for storing rated or standardized performance characteristic values or data relating to at least certain elements or components of an air mass flow distribution system including pipes 9, ducts 7, 7', 61', 71, valves 51, 53 fans or blowers 52, a climate pack or air conditioner 61, a fresh air distribution system 6, and at least one turbo-engine 8 for providing fresh air. The network will be described in more detail below. The control unit 1 or CPU further comprises a control output 3 of a comparing circuit 31 and a computer 32 also referred to as corrector. The computer or corrector 32 has stored in its memory (not shown) an algorithm for calculating updated or rather corrected performance characteristic values based on data representing standardized, rated performance characteristic curves or fields of such curves stored in a memory 2 of the CPU and based on data received from aircraft related sensors 11 and 12 which as such are part of the aircraft flight data management unit or equipment. The data stored in the memory 2 represent rated performance characteristics of the ducts, fans, valves, etc. One input of the computer or corrector 32 is electrically connected to the memory 2 for receiving the rated data while another input of the computer or corrector 32 is electrically connected to the sensors 11 and 12 for receiving actual pressure, temperature and altitude flight data. The comparing circuit or comparator 31 has one input connected to the output of the corrector 32 to receive corrected rated performance characteristic values for comparing with actual data or values received at a second input of the comparator 31 from a data acquisition and processing circuit 4 that receives its data from air flow network related sensors. The control output 3 of the comparator 31 is connected through control data busses 10A, 10B, 10C, 10D and 10E to network elements, the performance of which must be controlled. These network elements are the valves 51, 53, the fans or blowers 52 and the at least one fresh air supplying turbo-engine 8. Thus, the control output 3 provides closed loop control signals to the just mentioned network elements to be controlled as will be described in more detail below.

The data acquisition and processing circuit 4 has a plurality of inputs connected through electrical sensor conductors or busses 10' to any one of a plurality of the network related sensors. For example, a sensor 5 is provided directly inside a common or main air supply duct 7 for measuring any one of the following data, the pressure and/or the temperature and/or the volume flow inside the duct 7. The duct 7 is connected to a plurality of individual branch lines 9 and to air users or air outlets 9'. The common or main duct 7 receives air from a distribution duct 7' which is connected to at least one air conditioner or climate pack 61 through a duct 61' feeding conditioned air into the distribution duct 7' in which the air is transported by the air flow driving fans or blowers 52. The outputs of the fans or blowers 52 are connected to the main duct 7. Only two individual branch lines 9 branch off directly from the main duct 7 and lead to outlets 9'. However, a multitude of such branch lines 9 and outlets 9' may be used in practice. The aircraft fuselage merely shown symbolically by an arrow F receives air from the duct 7 through a controllable valve 51, preferably provided with its own performance sensor 51' connected through a sensor conductor 10' to an input of the data acquisition circuit 4.

The air flow drive fans 52 are equipped with sensors 52' for measuring pressure loss characteristics of the fans 52. Signals from these sensors 52' are supplied to a respective input of the data acquisition circuit 4 through respective sensor conductors 10'.

Individual sensors 9" are preferably provided in or on the individual distribution pipes 9 or a fresh air connecting line 9A for measuring temperature, pressure, and/or the flow volume through these individual distribution pipes 9, 9A to the users or outlets 9'.

Fresh air is supplied into the distribution network by at least one turbine engine 8 connected to the individual distribution lines 9 by a fresh air supply line 71 leading into the fresh air connecting line 9A which leads to all outlets 9', A flow control valve 53 and a fresh air distribution system 6 are connected in the fresh air supply line 71. The valve 53 preferably has its own sensor 53' connected by a sensor bus 10' to the circuit 4. It is alternatively or additionally possible to connect the fresh air supply line 71, for example to the main supply ducts 7, 7'. A further sensor 71' is positioned or connected to sense the temperature, the pressure, and/or the air mass flow or volume in the fresh air supply line 71. The sensors just described form a first group of network related sensors.

The Figure shows further aircraft or fuselage related sensors 11 and 12 which are preferably part of the flight data management unit (FDMU) that is part of the central aircraft control. The sensor 11 measures the current altitude and provides its output signal through a sensor databus 10' to one input of the corrector 32. The sensor 12 comprises several sensor elements distributed inside and outside the aircraft for measuring the pressure and temperature at various points within the aircraft fuselage and outside thereof. A respective output of the sensor 12 is also connected through the databus 10' to the corrector 32.

In operation, the data acquisition and conversion circuit 4 processes all actual network related input data received on the sensor conductors or busses 10 to provide actual data to one input of the comparator 31. The performance characteristic corrector 32, receives, in addition to the data from the sensors 11 and 12 for performing updating calculations, the rated performance characteristic values or data from the memory 2. The corrector 32 calculates corrected performance characteristic data and supplies these data or respective signals to another input of the comparator 31. These corrected signals are based on the rated, standardized performance characteristic values stored in the memory 2 and on the current information regarding the pressure, temperature and altitude inside and outside of the aircraft fuselage as provided by the sensors 11 and 12.

The comparator 31 provides at its output 3 a closed loop control output signal that is supplied for example through the control bus 10A, 10F to the turbo-engine 8 and through the control bus 10A, 10B to the airflow fan 52. The control signal at the output 3 is further supplied through the control bus 10A, 10C to the flow control valve 51 in the main duct 7 and through the control bus 10A, 10D to the flow control valve 53 in the fresh air line 71. The control signal is further supplied through the control bus 10E to another air flow fan or blower 52 in the main duct 7. A plurality of such fans or blowers may be placed throughout the air distribution network.

By providing a corrected rated performance characteristic input to the comparator 31, rather than a static standardized rated input, the closed loop control according to the invention adapts the current air supply volume to the current flight conditions of the aircraft, particularly during ascending and descending flight, whereby sensor signals measured inside the fuselage and even inside the air supply lines and ducts are taken into account as well as sensor signals measured outside the aircraft.

The present control is a continuously progressing, iterative control which avoids that too much air or too little air is supplied to any individual air outlet 9' or air consumer at varying flight conditions and altitudes.

Figure 2:
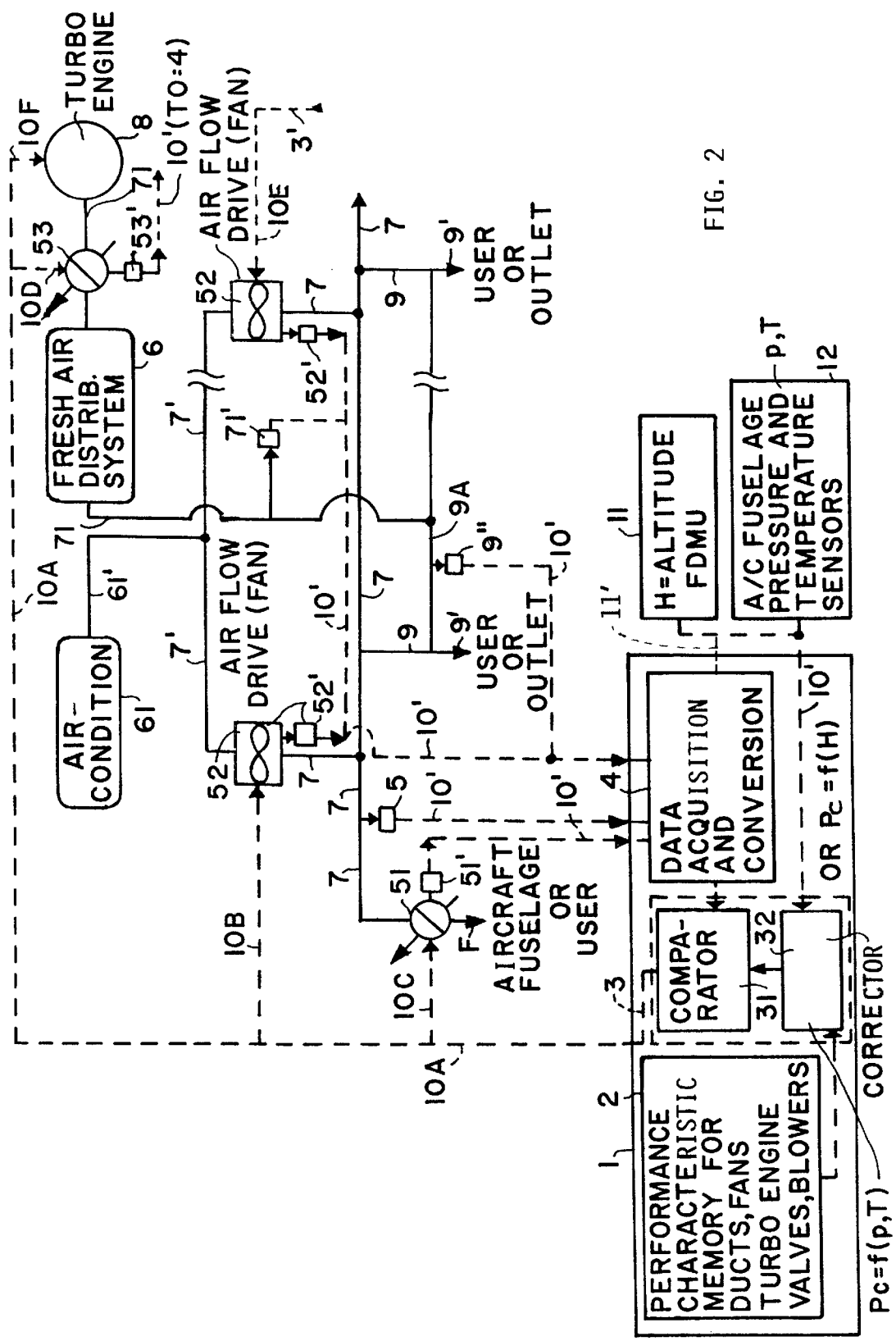

FIG. 2 shows a modified system wherein the data acquisition and conversion circuit 4 also receives data from the flight data management unit FDMU of the aircraft including flight altitude data through a dashed line connection 11'.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A system for controlling an air mass flow inside an aircraft fuselage in response to a current flight altitude, said system comprising a controllable air mass flow distribution network including air flow conduits (7, 7', 9, 71, 71'), at least one air outlet (9') connected to one of said air flow conduits, at least one controllable air flow control element (8, 51, 52, 53) connected to said air flow conduits for moving air through said air mass flow distribution network to said at least one air outlet (9'), a closed loop control unit (1) including a memory (2) for storing rated, first data representing at least one rated performance characteristic of said at least one controllable air flow control element in said air mass flow distribution network, a first group of network related sensors (5, 9", 51', 52', 53', 71'), a second group of aircraft related sensors (11, 12), said first and second group of sensors including pressure sensors, temperature sensors, performance sensors including air flow volume sensors, and at least one altitude sensor, said first group of sensors being positioned for sensing actual second data representing any one of actual performance characteristics, actual pressure, and actual temperature of said air mass flow distribution network, said second group of sensors being positioned for sensing actual third data representing any one of actual altitude, temperature and pressure data of said aircraft fuselage, said closed loop control unit (1) further comprising a corrector (32) having a first input connected to said memory (2) for receiving said rated first data and a second input connected to said second group of sensors (11, 12) to receive said actual third data for calculating parameter corrected data, said closed loop control unit (1) further including a comparator (31) having a first input connected to an output of said corrector (32) for receiving said parameter corrected data from said corrector (32), said comparator (31) having a second input connected to said first group of sensors for receiving said actual second data, said comparator (31) comprising an output (3) connected to said at least one controllable air flow control element of said air mass flow distribution network for controlling said air mass flow through said at least one controllable air flow control element.

2. The system of claim 1, further comprising a data acquisition and conversion circuit (4), comprising at least one input connected to said first group of sensors for receiving said actual second data, and an output connected to said comparator (31).

3. The system of claim 1, wherein said rated first data stored in said memory comprise data representing pressure loss first characteristics and static pressure second characteristics of said controllable air mass flow distribution network, and an operational third characteristic of at least one fresh air source (8) for feeding fresh air into said air mass flow distribution network in response to said first, second and third characteristics.

4. The system of claim 3, wherein at least one of said first, second and third characteristics is stored in said memory (2) in the form of one or more characteristic curves or fields of characteristic curves.

5. The system of claim 1, wherein at least one sensor of said first group of sensors is arranged inside of at least one of said air flow conduits and wherein sensors of said second group of sensors are arranged inside and outside of said aircraft fuselage.

6. The system of claim 5, wherein said at least one sensor of said first group of sensors inside said at least one of said air flow conduits is one of a pressure sensor, a temperature sensor and an air flow volume sensor.

7. The system of claim 1, wherein said second group of sensors comprise at least one external air volume sensor positioned for measuring an air mass flow throughput of external air flowing downstream of said aircraft fuselage.

8. The system of claim 1, wherein said at least one controllable air flow control member comprises one of a controllable flow control valve and an r.p.m. controllable fan or blower.

9. The system of claim 1, wherein said corrector (32) comprises a program memory having stored therein a computing algorithm ($p_c=f(p, T)$ or $p_c=f(H)$) for correcting a rated performance characteristic of said air mass flow distribution network in response to data from said second group of sensors to provide said parameter corrected data to said first input of said comparator (31), wherein $P_c$ is the corrected cabin pressure, p is the current pressure, T is the temperature and H is the altitude.

10. The system of claim 9, wherein said comparator (31) compares current performance characteristics of said distribution network measured by said sensors of said first group at current actual pressures and current actual temperatures, with performance characteristic data corrected in response to pressure, temperature and altitude parameters measured by said second group of sensors for a ascertaining any deviations of current performance characteristic data from respective corrected performance characteristic data.

11. The system of claim 1, wherein said comparator output (3) is connected through a respective control signal bus (10A, 10B, 10C, 10D, 10E) to said at least one controllable air flow control member (51, 52).

12. The system of claim 11, wherein said controllable air mass flow distribution network comprises at least one fresh air source (8) for supplying fresh air into said network, and wherein said fresh air source (8) has a control input connected to said comparator output (3) for controlling said fresh air supply in accordance with a performance characteristic of said fresh air source.

13. A method for controlling an actual air volume or air mass flow in an air mass flow distribution network in an aircraft fuselage, said method comprising the following steps:

(a) storing in a memory rated performance characteristic data of at least one controllable air flow control element (8, 51, 52 or 53) of said air mass flow distribution network, (b) measuring pressure, temperature and altitude actual data and processing said actual data to provide actual correcting signals for correcting said rated performance characteristic data in a corrector (32), (c) correcting said rated performance characteristic data with reference to said actual correcting signals in said corrector (32) and with a correcting algorithm ($P_c=f(p, T)$ or ($p_c=f(H)$) in said corrector (32), wherein $P_c$ is the cabin pressure, p is the current is pressure, T is the temperature and H is the altitude for providing corrected performance characteristic data, (d) sensing at said at least one controllable air flow control member actual performance characteristic data, (e) comparing said actual performance characteristic data with said corrected performance characteristic data for generating a control signal, and (f) controlling said at least one controllable air flow control element in response to said control signal for keeping said actual air volume flow optimally close to a rated air volume flow.

14. The method of claim 13, wherein said step of measuring said actual pressure, temperature and altitude data is performed inside said aircraft fuselage.

15. The method of claim 13, wherein said step of measuring said actual pressure, temperature and altitude data is performed outside said aircraft fuselage.

16. The method of claim 13, wherein said step of storing said rated performance characteristic values in said memory comprises storing performance characteristic curves or fields of curves in said memory.

17. The method of claim 13, wherein said step of a correcting said rated data comprises recalculating said rated performance characteristic data in response to any one of said actual data to provide said corrected performance characteristic data.

18. A system for controlling an air mass flow inside an aircraft fuselage in response to a current flight altitude, said system comprising a controllable air mass flow distribution network including air flow conduits (7, 7', 9, 71, 71'), at least one air outlet (9') connected to one of said air flow conduits, at least one controllable air flow control element (8, 51, 52, 53) connected to said air flow a conduits for moving air through said air mass flow distribution network to said at least one air outlet (9'), a closed loop control unit (1) including a memory (2) for storing rated, first data representing at least one rated performance characteristic of said at least one controllable air flow control element in said air mass flow distribution network, a first group of network related sensors (5, 9", 51', 52, 53', 71'), a second group of aircraft related sensors (11, 12), said first and second group of sensors including pressure sensors, temperature sensors, performance sensors including air flow volume sensors, and at least one altitude sensor, said first group of sensors being positioned for sensing actual second data representing any one of actual performance characteristics, actual pressure, and actual temperature of said air mass flow distribution network, said second group of sensors being positioned for sensing actual third data representing any one of actual altitude, temperature and pressure data of said aircraft fuselage, said closed loop control unit (1) further comprising a corrector (32) having a first input connected to said memory (2) for receiving said rated first data and a second input connected to said second group of sensors (11, 12) to receive said actual third data for calculating parameter corrected data, said closed loop control unit (1) further including a comparator (31) having a first input connected to an output of said corrector (32) for receiving said parameter corrected data from said corrector (32), said system further comprising a data acquisition and conversion circuit (4) having at least one first input connected to said first group of sensors, at least one separate second input connected to at least one sensor of said second group of sensors for receiving flight data including flight altitude data of said aircraft fuselage from a flight data management unit (FDMU), said comparator (31) having a second input connected to said data acquisition and conversion circuit (4), said comparator (31) further having an output (3) connected to said at least one controllable air flow control element of said air mass flow distribution network for controlling said air mass flow through said at least one controllable air flow control element.

* * * * *